C. F. BROWN.
LIQUID MEASURING AND REGISTERING APPARATUS.
APPLICATION FILED DEC. 20, 1913.
1,146,232.
Patented July 13, 1915.
2 SHEETS—SHEET 1.
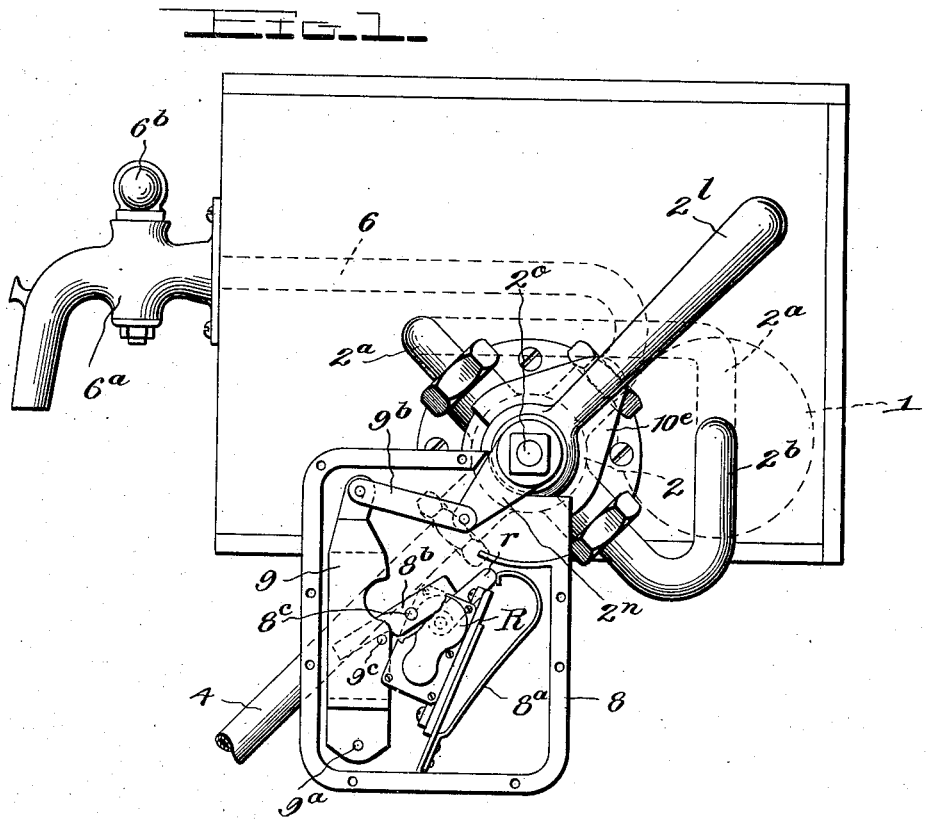
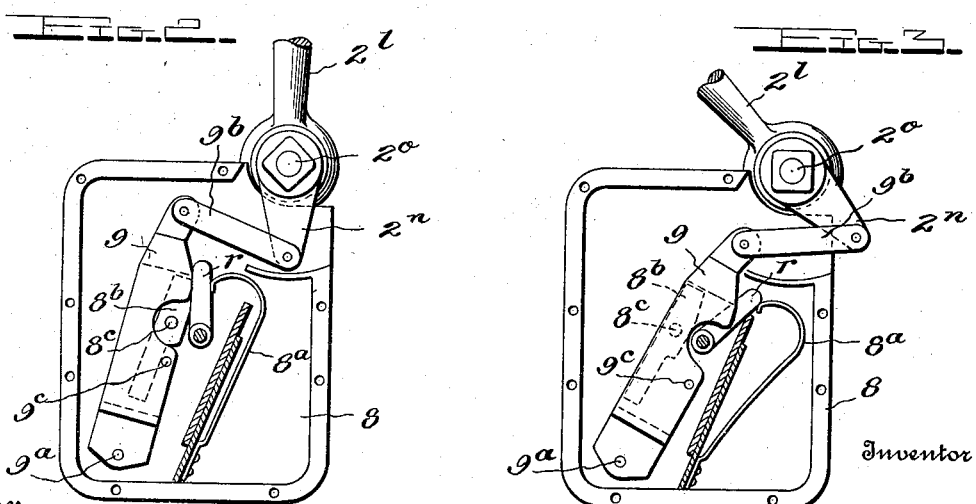

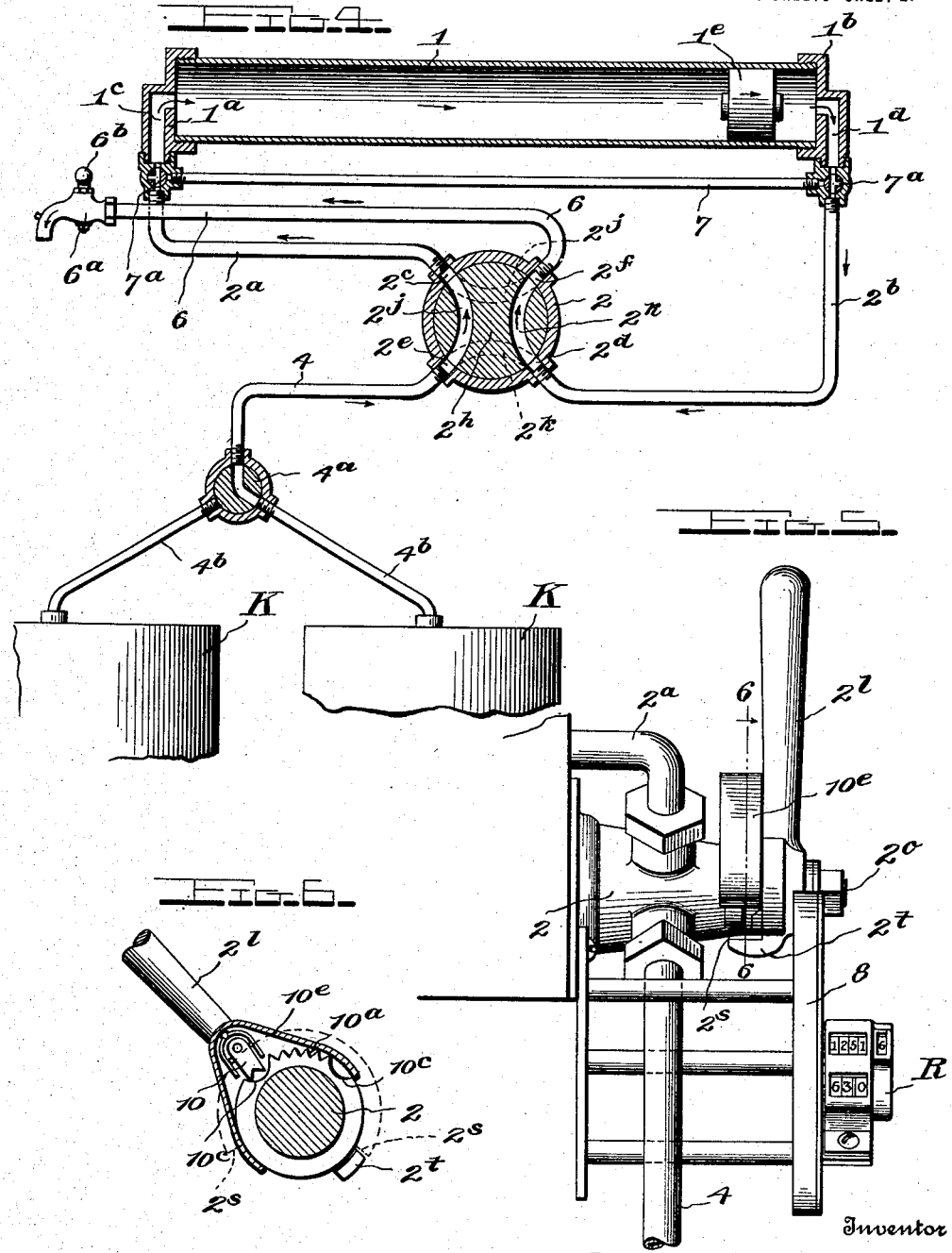

UNITED STATES PATENT OFFICE.

CHARLES F. BROWN, OF NEW YORK, N. Y., ASSIGNOR TO UNIVERSAL LIQUID REGISTER COMPANY, OF NEW YORK, N. Y., A CORPORATION OF NEW YORK.

LIQUID MEASURING AND REGISTERING APPARATUS.

1,146,232.

Specification of Letters Patent.    Patented July 13, 1915.

Application filed December 20, 1913. Serial No. 807,911.

*To all whom it may concern:*

Be it known that I, CHARLES F. BROWN, a citizen of the United States, residing at New York, in the county of New York and State of New York, have invented certain new and useful Improvements in Liquid Measuring and Registering Apparatus; and I hereby declare that the following is a full, clear, and exact description thereof, reference being had to the accompanying drawings, which form part of this specification.

This invention is a novel apparatus for dispensing liquids, and is particularly designed for use in dispensing charged beverages such as beer.

The object of the invention is to enable the liquid contents of a vessel to be accurately measured as it is dispensed and to avoid loss or erroneous measure due to expansion or foaming of the liquid when relieved from pressure. The apparatus is to be interposed between the dispensing faucet and the original cask or container, and the liquid is passed through the apparatus as it is dispensed, and the liquid is accurately measured thereby and does not have an opportunity to foam or expand in passing from the original container through the measuring apparatus. The liquid is measured in stated quantities, and the quantities registered, so that by inspection of the register the owner of the apparatus can at once tell how much liquid has been dispensed; and he can also by noting the register readings determine how much liquid has been supplied to him in the original container.

I will explain one practical form of the invention which will enable those skilled in the art to construct and use the same, and refer to the claims for a summary of the features and combinations of parts for which protection is desired: the apparatus however is susceptible of modification in form and arrangement as will be obvious when the invention is fully understood.

In said drawings—Figure 1 is an end elevation of the apparatus with the cover of the register actuating mechanism removed. Figs. 2 and 3 are views of the register actuating mechanism showing the parts in different positions. Fig. 4 is a sectional view of the registering vessel and also shows in connection therewith a diagrammatic view of other portions of the apparatus. Fig. 5 is a side view of the measuring valve and registering devices. Fig. 6 is a detail section on line 6—6, Fig. 5.

The measuring device proper preferably consists of a cylinder 1 closed at both ends by heads $1^a$ and $1^b$; head $1^a$ is provided with a port communicating with a nipple $1^c$, and head $1^b$ with a port communicating with a nipple $1^d$, to which nipples are attached pipes $2^a$, $2^b$, hereinafter referred to. Within this container is fitted a piston $1^e$ which is movable longitudinally of the cylinder and is adapted to be moved by the liquid admitted into the cylinder as hereinafter explained.

The pipes $2^a$ and $2^b$ are respectively connected at their outer ends to ports $2^c$, $2^d$, of a four-way valve casing 2. The ports $2^d$, $2^c$, are preferably diametrically opposite each other and intermediate these ports $2^c$, $2^d$ are diametrically opposite ports $2^e$, $2^f$; the port $2^e$ communicates with a supply pipe 4, and the port $2^f$ with a dispensing pipe 6, hereinafter referred to.

Within the casing 2 is a valve $2^h$ to the stem $2^n$ of which is connected a lever $2^l$ by which the valve can be manually operated. This valve has two transverse ports $2^j$, $2^k$, which are so formed that by turning the valve in one direction communication will be established through the port $2^j$ between the ports $2^c$ and $2^e$; and simultaneously port $2^k$ will establish communication between the ports $2^d$ and $2^f$ as illustrated in full lines in Fig. 4. By properly turning the valve ports $2^j$ and $2^k$ can be shifted so that port $2^j$ will establish communication between the ports $2^c$ and $2^f$, and port $2^k$ will establish communication between the ports $2^e$ and $2^d$ as illustrated in dotted lines in Fig. 4.

The pipe 4 preferably communicates with a supply valve $4^a$ which may be connected by a pipe $4^b$ to a vessel K containing the liquid to be dispensed. Preferably the valve $4^a$ has two inlet ports so that it can be simultaneously connected to two vessels K, and the valve $4^a$ is so arranged that communication can be established alternately between the pipe 4 and either vessel K.

The pipe 6 is connected to a dispensing faucet $6^a$ which can be operated manually by a handle $6^b$. All the pipes to the working parts should be made or lined with non-corrosive metal.

To the stem of valve $2^h$ is connected a registering mechanism by which each shift of the valve lever is registered; this mechanism is constructed as follows: In order to register the amount of liquid passed through the measuring vessel 1 it is necessary that each operative movement of the valve $2^h$ be registered. Assuming for example that the measuring vessel can contain but one pint of liquid, the register will register a pint, or one unit of measure, each time that the valve $2^h$ is shifted to the right or to the left; as for each movement of the valve a pint of liquid is passed into the vessel 1, and a like amount discharged therefrom.

Beside the valve 2 is a casing 8 to the outer side of which is attached a registering mechanism R of any suitable construction; I preferably use the so-called "Veeder" register, a well known type, which is operated by means of a lever $r$ attached to the operating shaft of said register. The lever $r$ lies within the casing 8 and is engaged by a spring $8^a$ that normally tends to move said lever $r$ to the left. Pivoted in the casing 8 at the side of the lever $r$ opposite spring $8^a$ is a lever $8^b$, which is pivoted at $8^c$ and its upper end is adapted to engage the lever $r$. At the side of lever $8^b$ opposite lever $r$ is a major lever 9 which is pivoted at $9^a$ and extends above the lever $8^b$ and is pivotally connected at its upper end with a link $9^b$ which in turn is pivotally connected to the outer end of an arm $2^n$ attached to the stem $2^b$ of the valve $2^h$. The lever 9 is preferably recessed on its under side so that it can move over the lever $8^b$ and not interfere therewith, but said lever 9 is provided with a pin or lug $9^c$ which is adapted to engage the lever $8^b$ below its pivot $8^c$ so that as the lever 9 is swung to the left, said pin $9^c$ will engage the lower portion of lever $8^b$ and rock said lever on its pivot forcing its upper end to the right; and as the upper end of lever $8^b$ engages lever $r$, it will throw this lever $r$ to the right. In Fig. 1 the cover of the casing 8 is removed and the lever 9 is shown as moved to its extreme left hand position, as the valve lever $2^l$ is in its extreme right hand position, in which position the ports of valve $2^h$ would register as indicated in Fig. 4. In this position of the valve lever $2^l$ the register lever $r$ is in its extreme right-hand position and is held in this position by reason of the engagement of pin $9^c$ with lever $8^b$, and spring $8^a$ is under tension. If the lever $2^l$ be now thrown to the left the parts would operate as follows: As lever 9 moves to the right, pin $9^c$ would permit the lever $8^b$ to move under the influence of the spring $8^a$ which would force lever $r$ to move to the left, until the parts reach the position shown in Fig. 2; then the upper part of lever 9 would engage the lever $r$ above the lever $8^b$ and would force lever $r$ back to the position indicated in Fig. 3, while lever $2^l$ moves to the forward position, Fig. 3. When the lever $2^l$ is in its forward position, Fig. 3, the valve $2^h$ would be in the position indicated in dotted lines in Fig. 4.

Upon the return movement of lever $2^l$ to the position shown in Fig. 1 the parts would operate as follows: Lever $r$ would first be moved to the left by the action of spring $8^a$, then pin $9^c$ would engage the lower end of lever $8^b$ and rock said lever and cause it to engage lever $r$ and move lever $r$ back to the right; while lever 9 continues to move to the left until the parts assume the position indicated in Fig. 1. It will thus be seen that for each stroke of the lever $2^l$ the lever $r$ makes two strokes and this complete oscillatory movement of lever $r$ is effected by the novel arrangement and coöperation of the levers 9 and $8^b$ as above explained; therefore at each shift of the valve 2 the register registers one unit of measure, and the exact amount passed through the apparatus can thus be determined at any time by observing the register.

The movement of the valve lever $2^l$ may be limited by any suitable means; as shown it is provided with a stop finger $2^t$ engaging the stops $2^s$ which may be formed on or attached to the casing of the valve 2.

I preferably provide means to prevent the lever $2^l$ being partially shifted and then returned, and for this purpose I may provide the lever $2^l$ with a pawl 10 which is adapted to engage with a double faced ratchet segment $10^a$ attached to the casing of the valve 2, and in position to be engaged by said pawl; at each end of this ratchet segment is a notch $10^c$ into which the pawl can drop when the lever $2^l$ is moved to the extreme end of its stroke. When the lever moves to the right a dog engages the left hand face of the ratchet teeth and will prevent the lever being returned until it has made its complete stroke; upon making such complete stroke the dog drops into the notch $10^c$ and the lever can then be moved to the right, and when moved to the right the pawl will engage the left hand face of the ratchet teeth and prevent the lever $2^b$ being moved back until it has made its complete stroke to the right, then the pawl drops into the notch $10^c$, which will permit the lever to be returned to the left. The pawl and segment may be protected by a casing $10^e$ attached to lever $2^l$.

In practice, the measuring vessel 1 is preferably placed within a cooler or ice box so that liquid contents therein will be chilled.

The operation of the apparatus is as follows: after the container K has been connected to the supply valve $4^a$ the latter is opened, and assuming the valve to be in the position shown in Fig. 4 liquid will flow from the container through valve $4^a$, pipe 4, port $2^j$ and pipe $2^a$ into the end $1^a$ of the measuring device 1, and the liquid will force the piston $1^e$ in said container to the end $1^b$ thereof. When the faucet $6^a$ is opened; and any liquid contained between the piston $1^e$ and the head $1^b$ will be discharged through the pipe $2^b$, port $2^k$, pipe 6 and the faucet. When the piston $1^e$ is moved against the head $1^b$ it closes the outlet aperture in said head and no more liquid escapes through the faucet and no more liquid can enter the measuring vessel 1. This vessel is made of such size that it will contain a predetermined quantity of liquid, say one pint or one quart, and the introduction of such a quantity of liquid into the cylinder will force the piston to one end thereof.

When no more liquid escapes through the pipe 6, valve $2^h$ is shifted so as to establish communication between pipes 4 and $2^b$, and between pipes $2^a$ and 6 as indicated in dotted lines in Fig. 4; thereupon, when the faucet $6^a$ is opened, liquid will flow from the supply through pipe 4 and $2^b$ into the cylinder 1 through head $1^b$ and force the piston $1^e$ to the left; and liquid will be discharged through the pipes $2^a$ and pipe 6 to the faucet until the vessel is again emptied. When no more liquid flows through pipe 6, when the faucet is open, the valve $2^h$ must be again shifted. Thus by shifting the valve $2^h$ communication is established alternately between the supply and the opposite ends of the vessel, and between the opposite ends of the vessel and the faucet; but at no time can direct communication be established between the supply and the faucet; and the liquid is thus always held under its initial pressure between the supply and the piston $1^e$; and does not have any opportunity to foam until it is discharged from the faucet; and each shifting movement of the valve $2^h$ is registered on the register as described, and at any time by inspecting the register the total amount that has been withdrawn can be determined.

It is sometimes desirable to frequently cleanse the pipes and passages through which the fluid passes, and for this purpose it is customary to force a chemical solution through the pipes. The solution could be passed through the apparatus in the same way that the fluid passes; but it is unnecessary to flush the measuring vessel frequently for the reason that it is kept clean by the reciprocatory movement of the plunger $1^e$ therein. In order to facilitate cleansing the pipes and valves without running the fluid through the measuring vessel a by-pass pipe 7 may be connected with three-way valves $7^a$ interposed between the pipes $2^a$ and $2^b$ and the nipples $1^c$ and $1^d$ respectively. These valves $7^a$ when in normal position do not communicate with the pipe 7 but establish communication between the pipes $2^a$, $2^b$ and nipples $1^c$, $1^d$ respectively, as shown in Fig. 4. When it is desired to cleanse the circulating pipes with solution without introducing same into the measuring vessel, the valves $7^a$ are turned so as to close communication between pipes $2^a$ and $2^b$ and the cylinder 1; and establish communication between the pipes $2^a$, $2^b$, and pipe 7; then the solution can be circulated through the pipes 4, $2^a$, 7, $2^b$, and 6, and thus all the pipes and valves are quickly and thoroughly cleansed.

What I claim is:

1. In combination a registering mechanism having a rocking actuating lever, a spring engaging the register lever, a lever pivoted beside the register lever and adapted to engage the same, a major lever adapted to engage the oscillating lever when the major lever is moved in one direction, and to engage the register lever when thrown in the opposite direction, and means for operating the major lever.

2. In combination, a register having a rocking actuating lever, a spring for throwing said actuating lever in one direction, a movable member adapted to engage the lever on one movement, and means having an engaging relation with said lever on the other movement of said member whereby for each movement of the member the said actuating lever is first moved in one direction by said spring and then returned to normal position against the action of said spring.

3. In combination, a register having a rocking actuating member, and a spring for throwing said member in one direction; an oscillating lever adapted to engage the register actuating member; a major lever adapted to engage and actuate the oscillating lever when the major lever is moved in one direction, and means for operating the major lever, said parts being so related and engaged that each time the major lever is shifted in either direction the register actuating member is reciprocated.

4. In combination, a register having a rocking actuating lever, a spring for throwing said actuating lever in one direction, an oscillating lever pivoted beside the register actuating lever and adapted to engage the latter, a major lever beside the oscillating lever adapted to engage the oscillating lever and actuate the same when said major lever is moved in one direction, and to engage the actuating lever and operate same when said major lever is moved in the opposite direction, and means for operating the major lever.

5. In combination, a register having a rocking actuating lever, and a spring for throwing said actuating lever in one direction; with an oscillating lever adapted to engage the register actuating lever, a major lever adapted to actuate the oscillating lever when said major lever is moved in one direction, and to engage the actuating lever when said major lever is moved in the opposite direction, and means for operating the major lever.

In testimony that I claim the foregoing as my own, I affix my signature in presence of two witnesses.

CHARLES F. BROWN.

Witnesses:
A. D. DECKERSON,
A. F. FRIEDMAN.